Figure 1:
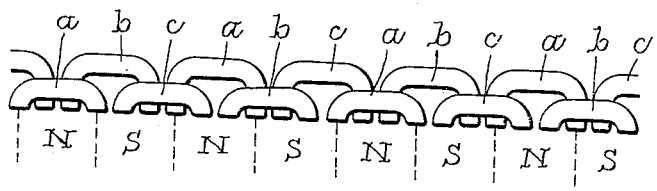

E. DANIELSON.
ALTERNATING CURRENT MOTOR.
APPLICATION FILED JUNE 24, 1907.

905,995.

Patented Dec. 8, 1908.

2 SHEETS—SHEET 1.

Witnesses
Lester H. Fulmer.
J. Ellis Glen

Inventor
Ernst Danielson
by Albert G. Davis
Atty.

E. DANIELSON.
ALTERNATING CURRENT MOTOR.
APPLICATION FILED JUNE 24, 1907.

905,995.

Patented Dec. 8, 1908.

2 SHEETS—SHEET 2.

Witnesses

Inventor
Ernst Danielson
Atty.

UNITED STATES PATENT OFFICE.

ERNST DANIELSON, OF STÖPSJÖN, FOGDHYTTAN, SWEDEN, ASSIGNOR TO GENERAL ELECTRIC COMPANY, A CORPORATION OF NEW YORK.

ALTERNATING-CURRENT MOTOR.

No. 905,995.  Specification of Letters Patent.  Patented Dec. 8, 1908.

Application filed June 24, 1907. Serial No. 380,567.

*To all whom it may concern:*

Be it known that I, ERNST DANIELSON, a subject of the King of Sweden, residing at Stöpsjön, Fogdhyttan, Sweden, have invented certain new and useful Improvements in Alternating-Current Motors, of which the following is a specification.

My invention relates to dynamo-electric machines, and particularly to multi-speed induction motors in which it is desired to connect the winding for different pole numbers.

Since the speed of an induction motor is determined by the number of its poles, arrangements for controlling the pole-numbers have been devised heretofore involving special coil connections or special forms of windings, or both. My present invention is particularly applicable to motors having a well-known type of primary winding in which the coils or sets of coils for each phase of each pole are distinct from each other, as contrasted with a "lap" winding in which the coils progress uniformly around the periphery so that the poles are distinguished only by the coil connections and not by the arrangement of the coils. This type of winding, where more than one coil per pole per phase is used, is sometimes known as a "basket winding", and with this type, the only variation in pole numbers heretofore obtained, so far as I am aware, has been in the ratio of 2 to 1. A standard three-phase motor provided with such a winding has every third coil or sets of coils connected in the same phase.

My invention, in one aspect, consists in providing suitable terminal leads whereby such a winding may be connected in two phases with every other coil included in the same phase. By thus altering the connections, the number of poles is varied in the ratio of 4 to 3, and by employing a T-connection when the coils of the winding are connected in two phases, the motor may be operated on a three-phase circuit with either pole number.

One objection that has existed heretofore to operating a two-phase machine with T-connection on a three-phase circuit is that in order that a balanced three-phase voltage should be produced by the winding, one phase should have fewer turns in it than the other, so that to secure the balanced voltage a portion of one phase must be cut out of circuit.

One feature of my invention consists in employing a voltage transformer adapted for connection with the two phases of the motor such that all the coils of both phases may be usefully employed and a balanced three-phase voltage obtained.

Figure 2:
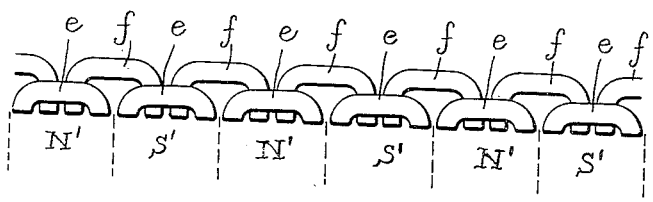
Figure 3:
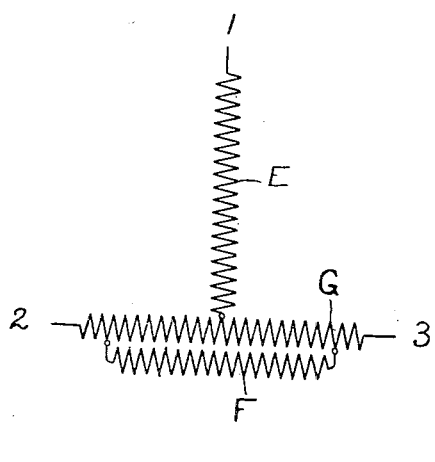
Figure 4:
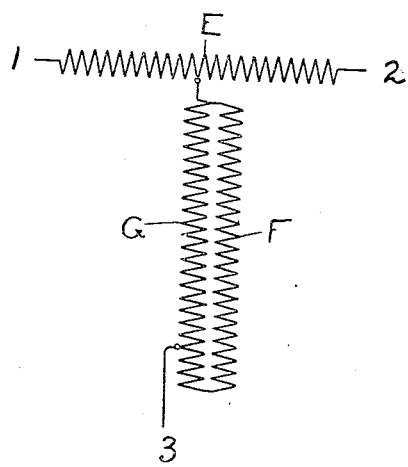
Figure 5:
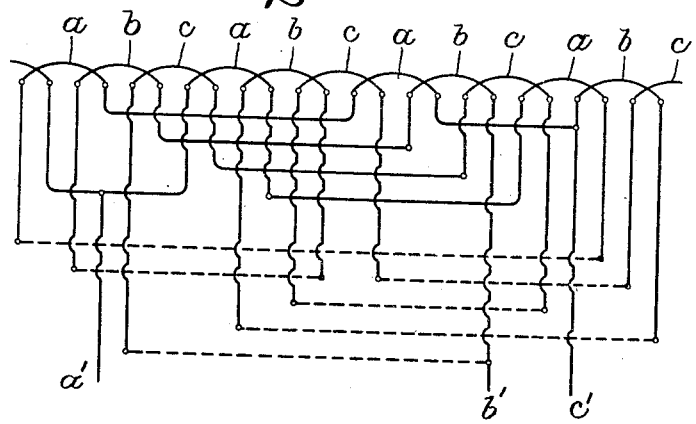
Figure 6:
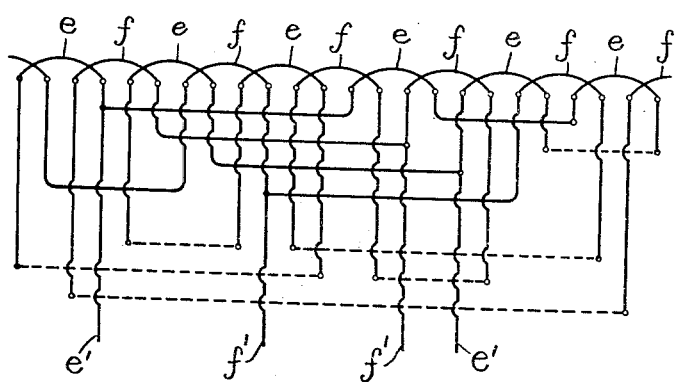

My invention will best be understood by reference to the accompanying drawings, in which Figure 1 shows diagrammatically a standard winding of a type to which my invention is applicable, and indicates the number and positions of the poles when the winding is connected in three phases; Fig. 2 is a similar diagram showing the positions of the poles when the winding is connected in two phases; Fig. 3 shows a diagram of a two-phase T-connected machine provided with a transformer in accordance with my invention; Fig. 4 shows a modification of the same; and Figs. 5 and 6 show the coil-connections for producing the polarities indicated in Figs. 1 and 2.

In Fig. 1 I have indicated diagrammatically a well-known type of motor winding. If this winding is connected in three phases, the coils $a$ will comprise one phase, coils $b$ a second, and the coils $c$ a third. The positions of the poles for the phase $a$ are indicated by the lines N and S. It will be noted that only a single coil per pair of poles per phase is used, but it will be understood that the conductors forming each coil $a$ may be concentrated in a single coil, as shown in the figure, or may be distributed so as to form a set of two, three or more coils, as in the well-known "basket" type of winding.

If, instead of connecting every third coil in the same phase, every other coil be connected in the same phase, then a two-phase arrangement is produced, as shown in Fig. 2, in which the coils $e$ represent one phase, and the coils $f$ the other. The positions of the poles for the first phase are represented by the letters N' and S'. It will be seen that with the two-phase connection there are two coils per pair of poles per phase, instead of only one, as in Fig. 1, and that the number of poles in Fig. 1 bears to the number of poles in Fig. 2 the ratio of 4 to 3. Thus, even with the type of winding shown, in which distinct coils or sets of coils are employed for each pole, a variation of the number of poles in the ratio of 4 to 3 may be obtained in a simple manner.

The winding, when connected in two phases, as shown in Fig. 2, may be operated from a three-phase circuit by employing a T-connection; but if a simple T-connection were used, either a portion of the coils of one phase would have to be left out of circuit, or else an unbalanced three-phase voltage would be produced. By the arrangement of Fig. 3, all the coils are in circuit, and a balanced three-phase voltage is secured. In this arrangement a voltage transformer or compensator G is employed. This compensator is connected between the motor terminals 2 and 3, and in T with the phase E, and the phase F is connected in shunt to a portion of the compensator. The compensator serves to produce a voltage between the terminals 2—3, greater than that of phase F, so that all the coils of phase E may be employed and a balanced three-phase voltage secured at the terminals 1—2—3. It may be demonstrated mathematically that the capacity of the compensator G need be not more than 17% of that of a transformer large enough to supply the total input of the motor, so that the cost of the motor is not greatly increased by the use of the compensator; while its capacity is increased as compared with the ordinary T-connections, since all its coils are in circuit.

Fig. 4 shows a different arrangement of the compensator. The phase E is connected between the terminals 1 and 2, while the compensator has one terminal connected to the central point of phase E, and an intermediate terminal connected to the motor terminal 3. The phase F is connected in shunt to the entire compensator. That this arrangement also produces a balanced three-phase voltage will be obvious to those skilled in the art.

Figs. 5 and 6 show the circuit connections between the coils for producing the three-phase arrangement indicated in Fig. 1 and the two-phase arrangement indicated in Fig. 2, respectively. The connections by which certain of the coils are permanently joined in groups are shown in full lines, while the connections that are changed in shifting from three-phase to two-phase connections are shown in dotted lines. In Fig. 5, the three phases are shown connected in delta, and the three terminals are indicated at $a'$, $b'$ and $c'$. In Fig. 6 the terminals of the phase $e$ are indicated by $e'$, and the terminals of the phase $f$ by $f'$.

It will be understood that while I prefer to employ a compensator or voltage transformer in connection with a motor arranged for control in accordance with my invention, I claim the control arrangement shown, whether a voltage transformer is employed or not; and it will further be understood that a transformer as shown in Figs. 3 and 4 may be employed in combination with any two-phase T-connected machine, whether arranged for a variable number of poles or not.

As I have explained above, while I have indicated in the drawings only a single coil per pole per phase, for the three-phase connection, or per pair of poles per phase for the two-phase connection, a set of coils may be, and ordinarily would be, employed in place of each coil shown in the drawings. Whether or not each set of coils includes one coil or more is immaterial to my invention, and when I employ the term "set of coils" in the appended claims it will be understood to cover a set of either one or more coils.

What I claim as new, and desire to secure by Letters Patent of the United States, is,—

1. In combination, a dynamo-electric machine for three-phase operation having a winding connected in two equal phases, and a transformer adapted for T-connection with said two phases to produce a balanced three-phase voltage.

2. In combination, a dynamo-electric machine for three-phase operation having a winding connected in two equal phases, and a transformer connected in T with one of said phases and in parallel with the other and adapted to produce with said phases a balanced three-phase voltage.

3. A dynamo-electric machine having a distributed winding comprising distinct sets of coils, said sets being provided with terminal leads whereby the same coils may be connected in three phases with every third coil included in the same phase, and in two phases with every other coil included in the same phase.

4. A dynamo-electric machine having a distributed winding comprising distinct sets of coils, said sets being permanently connected in groups and the groups being provided with terminal leads whereby the same groups may be connected in three phases with every third coil included in the same phase, and in two phases with every other coil included in the same phase.

5. A dynamo-electric machine having a distributed winding comprising distinct sets of coils, said sets being provided with terminal leads whereby they may be connected in three phases with every third coil included in the same phase, and in two phases with every other coil included in the same phase, and a transformer adapted for T-connection with said two phases to produce a balanced three-phase voltage.

6. A dynamo-electric machine having a distributed winding comprising distinct sets of coils, said sets being permanently connected in groups and the groups being provided with terminal leads whereby the winding may be connected in three phases with every third coil included in the same phase, and in two phases with every other coil included in the same phase, and a transformer adapted for T-connection with said two phases to produce a balanced three-phase voltage.

7. A multispeed alternating current motor having a winding with its coils connected in groups and provided with terminal leads whereby the same groups may be connected in three-phase with one number of poles and in two-phase for a second number of poles, said pole numbers bearing to each the ratio of 4 to 3.

8. A multispeed alternating current motor having a winding with its coils connected in groups and provided with terminal leads whereby the winding may be connected in three-phase with one number of poles and in two-phase for a second number of poles, and a transformer adapted for T-connection with the motor when the motor is connected in two-phase to produce with the motor winding a balanced three-phase voltage.

9. A multispeed polyphase motor having a winding with a single set of coils per pair of poles per phase and with its coils connected in groups and provided with terminal leads, whereby they may be connected in three phases with every third set of coils in the same phase, and in two phases with every other coil in the same phase.

10. A multispeed polyphase motor having a winding with a single set of coils per pair of poles per phase and with its coils connected in groups and provided with terminal leads, whereby they may be connected in three phases with every third set of coils in the same phase, and in two phases with every other coil in the same phase, and a voltage transformer adapted for T-connection with the two phases to produce therewith a balanced three-phase voltage.

In witness whereof, I have hereunto set my hand this sixth day of June, 1907.

ERNST DANIELSON.

Witnesses:
ANDERS HENRIK LARSON,
EMIL GUSTAF BOYC.